Jan. 17, 1967  F. WAHL  3,299,246
APPARATUS FOR WELDING CONTACTS ON CONDUCTIVE PARTS
Filed April 29, 1964  4 Sheets-Sheet 1

INVENTOR
F. WAHL
BY
ATTORNEY

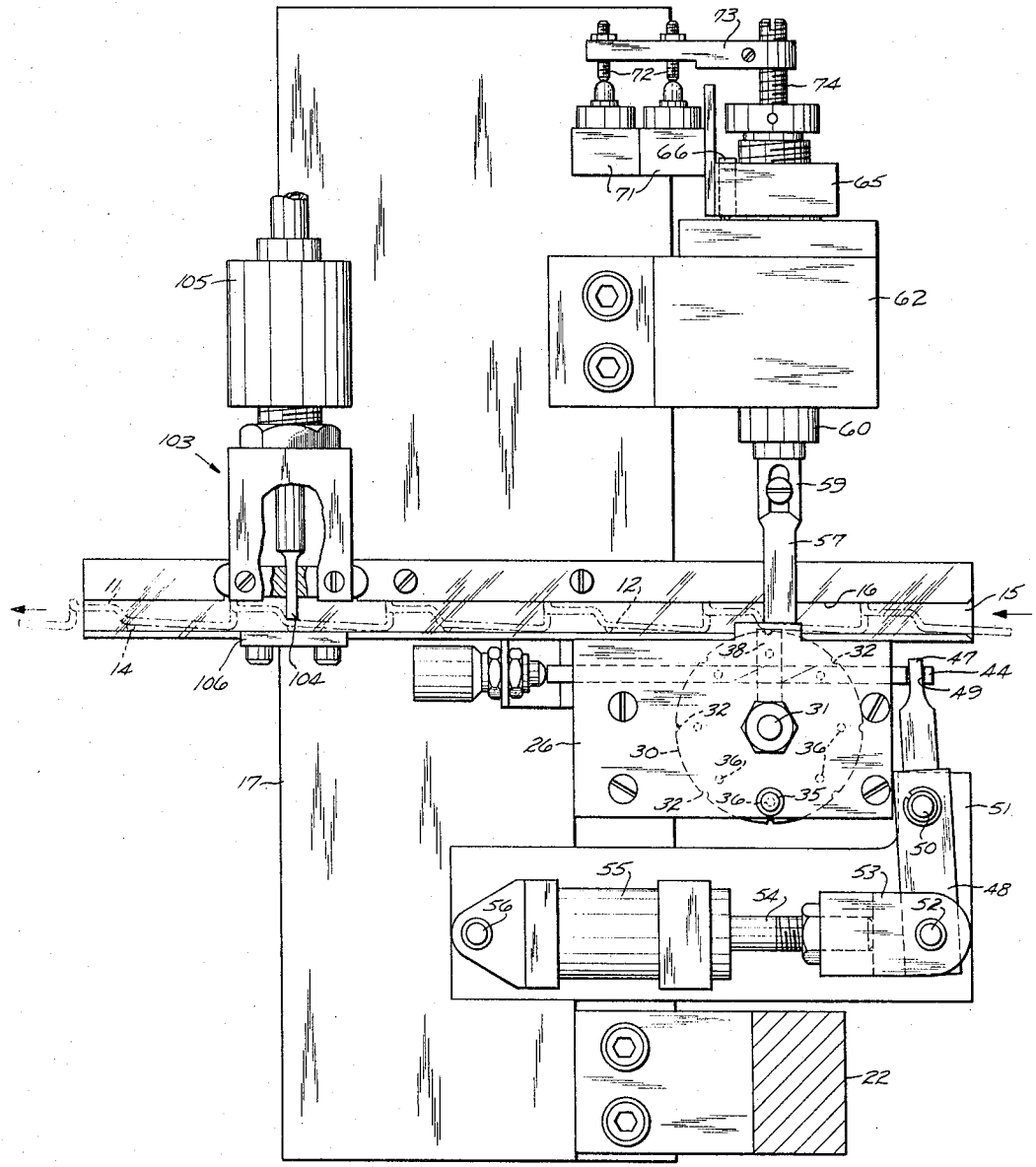

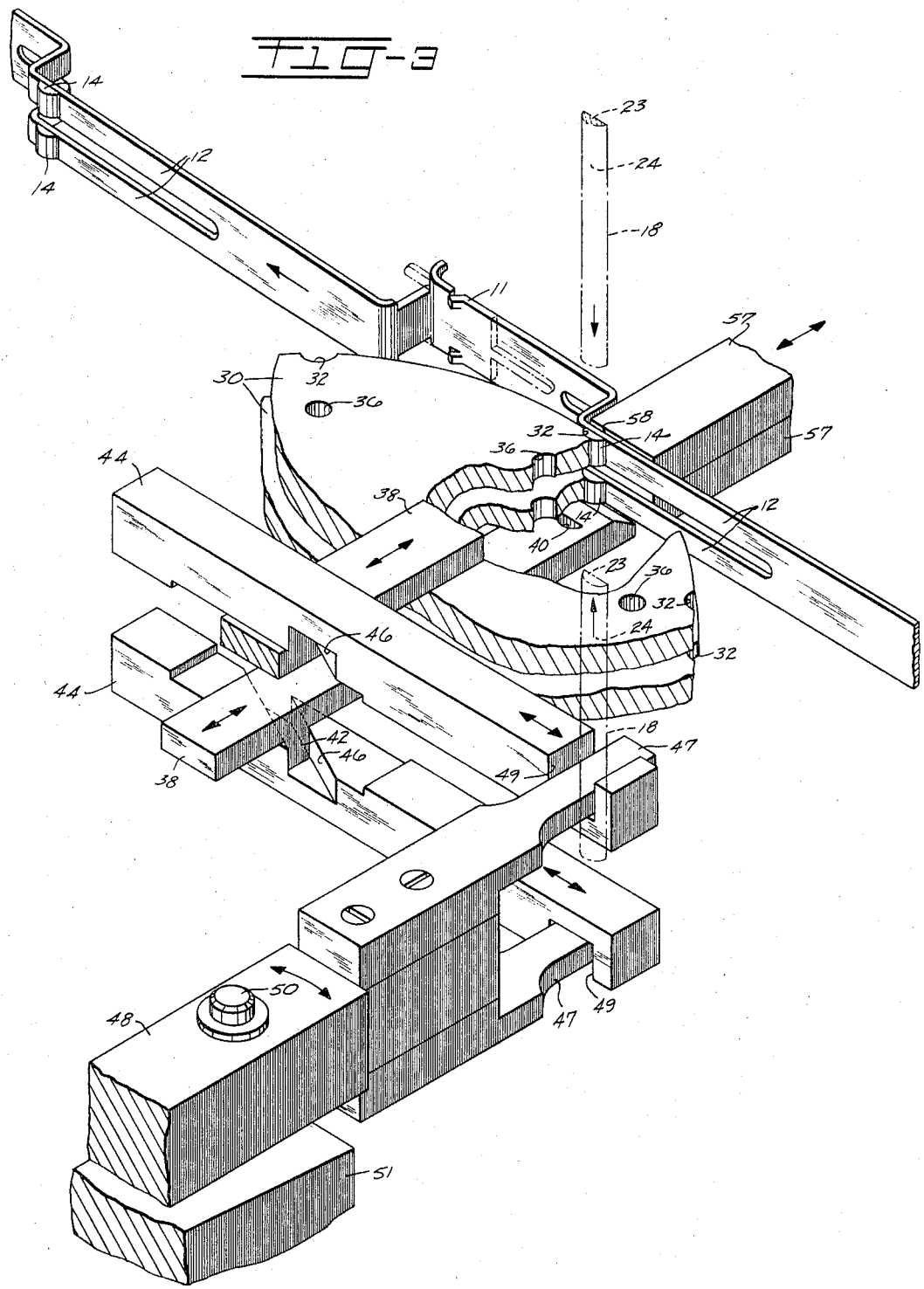

Jan. 17, 1967   F. WAHL   3,299,246
APPARATUS FOR WELDING CONTACTS ON CONDUCTIVE PARTS
Filed April 29, 1964   4 Sheets-Sheet 4
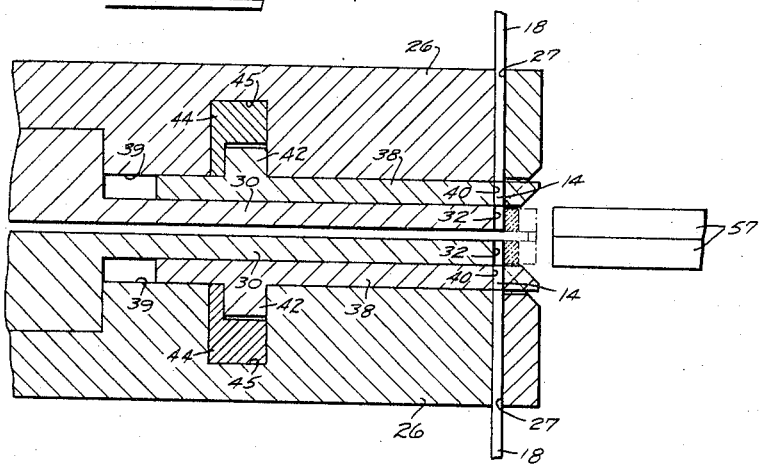
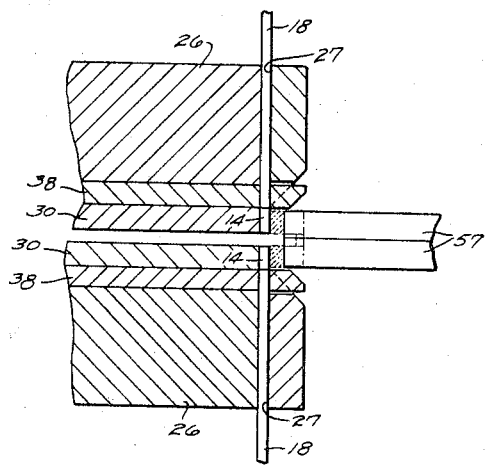 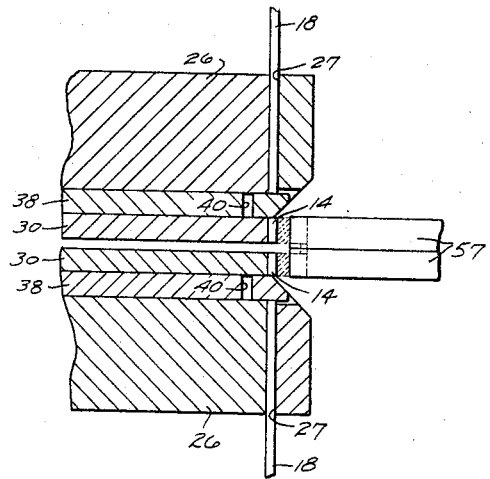
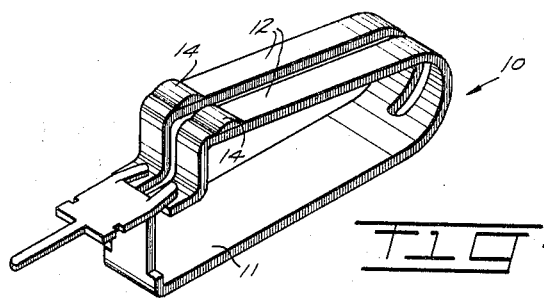

United States Patent Office 3,299,246
Patented Jan. 17, 1967

3,299,246
APPARATUS FOR WELDING CONTACTS ON CONDUCTIVE PARTS
Frank Wahl, North Bergen, N.J., assignor to Western Electric Company, Incorporated, New York, N.Y., a corporation of New York
Filed Apr. 29, 1964, Ser. No. 363,466
10 Claims. (Cl. 219—79)

This invention relates to apparatus for welding contacts on conductive parts, particularly contact springs for relays or the like.

In the present instance, there has been a demand for miniature relays and small electrical structures of this type. To comply with these requirements there is a great reduction in the size of the conductive parts or springs making it extremely difficult, not only to manufacture the springs, but particularly to cut and weld the contacts to the springs. In the present instance, two machines have been designed, one to partially form the springs from a metallic ribbon, the other machine to cut the springs from a ribbon and to finish the formation thereof.

An object of the present invention is an apparatus which is completely automatic and highly efficient in welding contacts on conductive parts.

In accordance with the object the apparatus includes a first electrode, having a recess therein, associated with a guide for a conductive ribbon, from which contacts are to be cut, and a cutter interposed between the guide and the first electrode and having an aperture therein to cut predetermined lengths from the ribbon and store them for reception in the recess.

In the present instance, the welding apparatus is interposed between the aforementioned machines to weld the contacts to the conductive parts while they are connected together in ribbon form.

Other objects and advantages will be apparent from the following detailed description when considered in conjunction with the accompanying drawings wherein:

FIG. 2 is a sectional view taken substantially along the line 2—2 of FIG. 1;

FIG. 3 is a fragmentary isometric view of the apparatus in the area of the electrodes and cutters;

FIG. 4 is a fragmentary vertical sectional view in the area of the electrodes and cutters illustrating the starting position of the operating cycle;

FIG. 5 is a fragmentary portion of the structure shown in FIG. 4 illustrating an intermediate portion of the operating cycle;

FIG. 6 is an illustration of the structure shown in FIG. 5 at the completion of the welding and cutting portions of the operating cycle; and FIG. 7 is an enlarged isometric view of a pair of contacts.

PRODUCT OF THE APPARATUS

Figure 1:
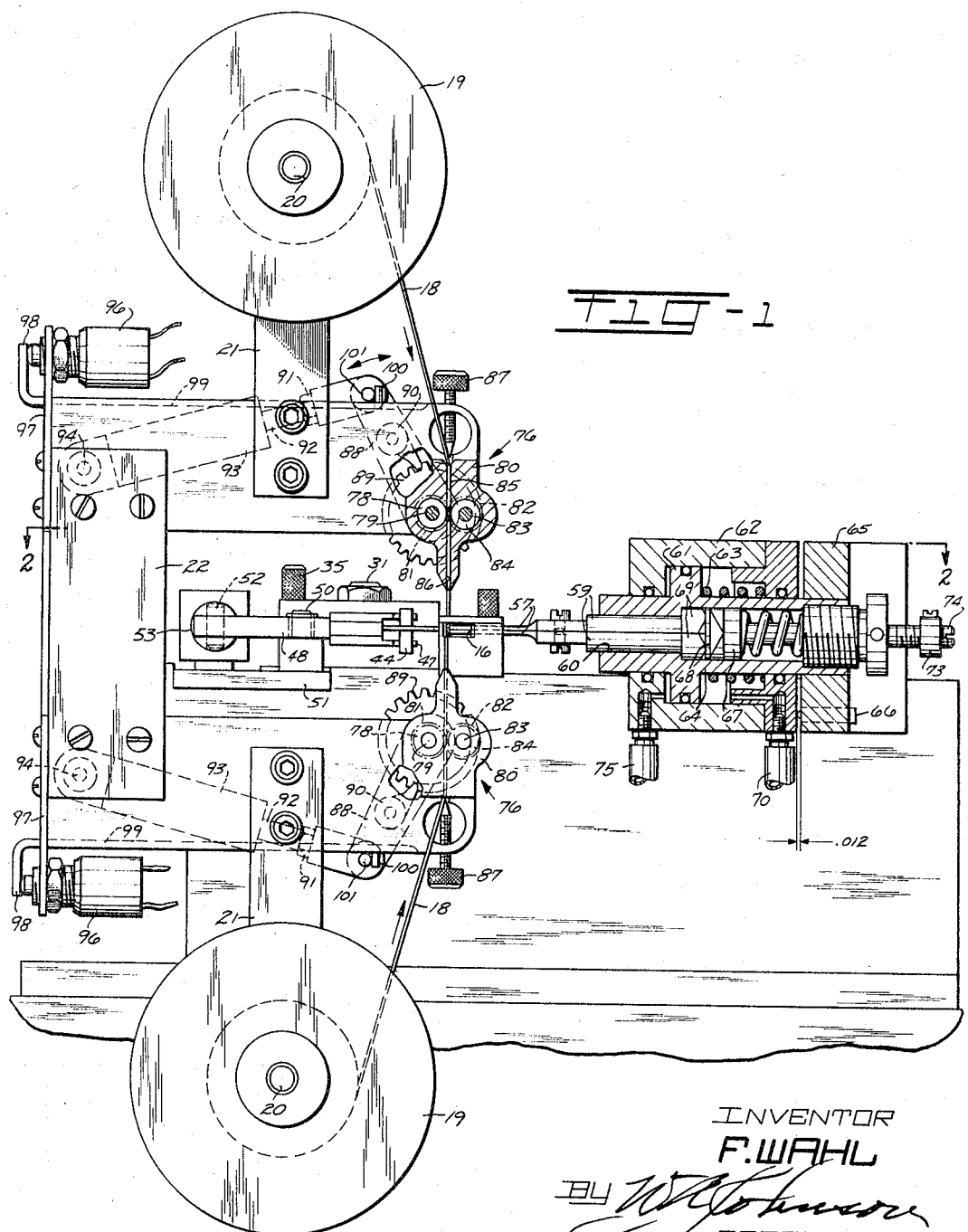
FIG. 1 is a side elevational view of the apparatus.

The finished product, indicated generally at 10, in FIG. 7, is the result of two machines and the present apparatus which is interposed between the machines to produce the product from a single ribbon, has a width as indicated at 11 with parts or spring portions 12 having contacts 14 welded thereon. The production of the contacts 14 and the welding of these contacts to the parts or spring portions 12 are certain functions of the present apparatus. Before reaching this apparatus the partially formed ribbon 11, FIG. 2, has a contour substantially as illustrated in this figure and is of this size, the one exception being in the thickness of the ribbon, the ribbon actually being much thinner than that shown in FIG. 2.

THE APPARATUS

The ribbon 11, with its parts or spring portions 12 is advanced intermittently into an entrance end 15 of a grooved guide 16 which is mounted on a suitable support 17.

Contacts 14 are cut from ribbons 18 received from supply reels 19 rotatably supported at 20 on brackets 21 mounted on a frame 22. As shown in FIG. 3, the ribbons 18 have flat surfaces 23 which are to be located against and welded to adjacent surfaces of the springs 12 of each part of the ribbon which is to be a completed structure as shown in FIG. 7. The remaining surfaces 24 of the ribbons 18 are arcuate. Parallel guides 26 FIGS. 4, 5 and 6 are provided with aligned apertures or guideways 27 similar in cross-sectional contour to the cross-sectional contours of the ribbons 18 to guide the ribbons accurately toward each other.

Wheel-like first electrodes 30 are interposed between the guides 26 pivotally supported at 31 and provided with arcuate recesses 32 at like spaced positions in their peripheries. The recesses 32 are similar in contour to the cross-sectional contour of the ribbons 18 and serve to form pockets for the contacts 14. Only one pair of recesses 32 will be used at a time, but due to the fact that eventually these recesses may become enlarged and their accuracy as to size being important, particularly in positioning the contacts 14 for welding to their springs 12, the first electrodes 30 may be moved after a predetermined number of welding operations to bring an unused pair of recesses 32 into welding operation. A pin 35 manually disposed in an aperture of the upper guide 26 may be raised to allow turning of the first electrodes 30 to locate a new pair of recesses 32 in the welding position after which the pin may be lowered into the adjacent one of a series of apertures 36.

As shown in FIGS. 3 and 4, cutters 38, positioned above and below their respective first electrodes 30, are movable in elongated recesses 39 in the inner surface of the guides 26 and are provided with apertures 40 having cross-sectional contours substantially identical to the cross-sectional contours of the ribbons 18. The cutters 38 are provided with projections 42 extending diagonally across the adjacent portions of the cutters as illustrated in FIG. 3. Cams 44 are movably disposed in parallel grooves 45 of the guides 26 and are provided with diagonally extending cam grooves 46 to receive the projection 42 of the cutters and cause movement of the cutters during longitudinal movements of the cams as illustrated by the arrows in FIG. 3. The means to operate the cams 44 include projections 47 of a lever 48, the projections being disposed in notches 49 of the cams. As shown in FIGS. 2 and 3, the lever 48 is pivotally mounted at 50 on a bracket 51, mounted on the frame 17, the opposing end of the lever being connected at 52 to a bifurcated member 53 mounted on a piston rod 54 of an air cylinder 55, the opposing end of the air cylinder being pivotally supported at 56 on the bracket 51. The air cylinder 55 is operated alternately to cause the cams 44 to move the cutters 38 alternately into two positions, one being shown in FIGS. 4 and 5, the other being shown in FIG. 6. In FIG. 4, the cutters are positioned to align the apertures 40 with the apertures 27 of the guides 26 so that the presently cut contacts 14, in the apertures 40, will be aligned with the ends of the ribbons 18 in their apertures 27. In FIG. 5, the contacts 14 have been moved into pockets including the recesses 32 of the first electrode 30 moving additional lengths of the ribbon 18 into the apertures of the cutters. In FIG. 6, the cutters have been moved to their other position and during this movement the measured lengths of the ribbons 18, or contacts 14, have been cut from the ribbons and stored in the cutters ready for the next welding operation.

As shown in FIGS. 2 and 3, second electrodes 57 have flat ends 58 to engage portions of the ribbon 11, particularly the opposing surfaces of the spring portions 12 to which the contacts 14 are to be welded. The electrodes 57 have enlarged portions 59 movably disposed in a hollow portion 60 of a piston 61 of an air cylinder 62. The piston 61, FIG. 1, is normally urged to the left by a spring 63 disposed concentric with a tubular portion 64 of the piston and disposed in the cylinder 62.

A collar 65, mounted on the external end of the tubular portion 64 of the piston 61, has a spring-pressed plunger 66 adjustably mounted in an aperture therein to engage the adjacent end of the cylinder 62 to create an initial stop for the second electrodes during forward action of the piston by the spring 63. When air is exhausted from the left side of the piston (FIG. 1) the spring 63 may move the second electrodes 57 to the initial stop position to locate the parts 12 across the recesses 32 of the first electrodes to provide pockets which will receive and firmly hold the contacts 14.

Means is provided to equalize the pressure applied to the parts 12 and contacts 14 through the second electrodes 57 not only during the initial action of forming the pockets between the recesses 32 in the first electrodes and the parts 12, but during the greater or welding pressure. This means includes a spring-pressed plunger 67 mounted as an adjustable but preset unit in the tubular portion 64 of the piston. A flat surface of the plunger 67 engages a conical side of an intermediate member 68 while an opposing flat side of the member engages reduced portions of heads 69 of the second electrodes 57. As a result of this structure any variations in the dimensions of the parts 12 and/or the contacts 14 will not prevent equal pocket-forming and welding pressures from being applied to the parts 12 and the contacts 14 by the second electrodes.

When air under pressure is forced through air line 70, the piston 61, FIG. 1, is forced to the left to force the second electrodes into welding position, applying uniform pressures to the parts 12 and contacts 14 against the first electrodes. This action moves the piston 61 from the initial stop position which is controlled by the spring-pressed plunger 66. The welding circuits for the pairs of electrodes are responsive to the piston controlling means, the spring 63 assisted by the plunger 66 holding the circuits inactive and the forcing of the piston into position to apply the welding pressure to the electrodes causing the welding circuits to become active. Each welding circuit is responsive to normally closed switches 71 fixedly supported by the collar 65. Adjustable members 72 supported by an arm 73, mounted adjustably on a threaded outer end of the plunger 67, are initially set so that the switches 71 of the welding circuits will be held open and stay open until the welding pressure is applied. This action on the piston 61 will cause closing the gap between the collar 65 and the adjacent end of the cylinder, compressing the plunger 66 and relative movement of the second electrodes and the plunger 67. When the second electrodes 57 have come to the ends of their movements there is a small additional movement of the piston 61 so that the actual welding pressure will be applied uniformly by the plunger 67 to the second electrodes. This action causes relative movement of the collar 65, supporting the switches 71 and the plunger 67, supporting the members 72 so that the switches will be allowed to close the welding circuits.

Feeding means for the ribbons 18, indicated generally at 76, are identical in structure and operation, the only difference being the upper ribbon is fed downwardly through the upper guide 26 and the lower ribbon is fed upwardly through the lower guide 26. Each unit has a drive roller 78 mounted on a spindle 79 which is journalled in a housing 80. A gear 81, mounted on the spindle 79, interengages a gear 82 which is mounted on a spindle 83 with a driven roller 84 so that when the upper drive roller 78 rotates in a clockwise direction intermittently its companion roller 84 will be driven in a counterclockwise direction to advance the upper ribbon downwardly a measured distance equalling the length of the contacts 14. In the lower unit 76, the drive roller 78 is rotated counterclockwise and through the gears 81 and 82, its driven roller 84 is rotated clockwise to cause feeding of the lower ribbon 18 upwardly a distance equalling the length of the contacts 14. There are outer guides 85 and inner guides 86 for the ribbons in each unit, suitable means 87 being employed to act against the flat surfaces of the ribbons to create suitable tensions therein.

The spindle 79 of the units 76 have levers 88 freely rotatable thereon adjacent ratchet wheels 89 which are fixed to the spindles. Pawls 90, pivotally supported by the levers 88, are adapted to connect the levers with the ratchet wheels 89 so that when the levers are operated in their driving directions, the upper lever clockwise and the lower lever counterclockwise, the ratchet wheels will be rotated partial turns to bring about driving actions of the feed rollers 78 and 84. The outer ends of the levers 88 are adjustably connected at 91 to piston rods 92 of air cylinders 93, the opposing or rear end of the cylinders being pivotally mounted at 94 on the frame 22. In actual practice, suitable means (not shown) is provided to operate the air cylinders 93 in their feeding directions after each intermittent advancement of the ribbon 11 to bring the next group of spring-portions or parts 12 into welding position. Switches 96, mounted on brackets 97, of the support 22, are positioned to be closed by projections 98 of the slides 99. The slides 99 may be urged outwardly normally by suitable means (not shown) but are provided with pins 100 positioned to be engaged by pivots 101 connecting the levers 88 with the outer portion of the connecting means 91 of the piston rods 92. Therefore, when the ribbon feeding units 76 have been moved through the feeding portions of their cycles, the switches 96, through the slides 99, will be closed to effect reversing of the piston in the air cylinder 93 to return the units 76 to their starting positions.

As shown in FIG. 2, a forming unit, indicated generally at 103, has a movable tool 104 actuated by an air cylinder 105 to strike against the back surfaces of the ribbon, particularly the parts or spring-portions 12 thereof, to force the contacts 14 welded to these portions against a stationary tool 106. The tool 106 is formed and adapted to reduce the contacts 14 to given thicknesses and to remove any sharp edges and burrs which might result from the cutting operations.

OPERATION

Prior to the operation of the feeding units 76, the cutters 38, under the control of the air cylinders 55 and cams 44 have been moved from the position shown in FIG. 6 to the position shown in FIG. 4 to bring the stored contacts in the apertures 40 into alignment with the apertures 27 of the guides 26 and the recesses 32 of the first electrodes 30. As a result, during the feeding actions of the units 76, measured lengths of the ribbons 18 are moved through the apertures 27 of the guides 26 and the contacts 14, presently stored in the apertures 40 of the cutters 38, are moved into the pockets composed of the recesses 32 of the first electrodes and the parts 12 which are held in position normally by the second electrodes 57. The cutters 38 may then be operated to cut the next pair of contacts 14 from the ribbons 18 and the second electrodes may be moved into welding position by air under pressure through line 70, FIG. 1, forcing the piston 62 to move the second electrode with suitable force against the parts 12. At the completion of this movement, that is, when the suitable welding pressure has been applied through the second electrodes against the parts 12, and, of course, the contacts 14 held by the recesses 32 of the first electrodes, switches 103, FIG. 2, are actuated into closed position by adjustable members 104 carried by an arm 105 mounted on an outer threaded end 106 of the plunger 68. The welding circuits are not shown, but it should be understood that these are well known in the art. The operation of the switches 103 will constitute completion of the welding circuits which includes the first electrodes 30, the second electrodes 57, and suitable time control means to de-energize the welding circuits after a predetermined length of time. After the welding operation has been completed, suitable means may be operated to cause line 70, FIG. 1, of the air cylinder 63 to be an exhaust line and direct air under pressure through line 75 to move the pistion 62 to the right to move the second electrodes 57 away from the path of the ribbon 11 so that the ribbon and its respective parts 12 may be advanced one position to bring the next set of parts 12 into welding position. Immediately after the advancement of the ribbon 11 and its parts 12, the piston 62 is caused to return to its normal position and at that time to be free of air pressure from the air lines 70 and 75 so that the spring 64 may function to position the ends of the second electrodes 57, FIG. 3, against the parts 12 of the ribbon 11 to extend across the recesses 32 of the first electrodes 30 forming pockets to receive the next set of contacts 14 from the apertures 40 of the cutters 38. These operations continue automatically to cut measured lengths from the ribbons 18 which then become identified as contacts 14, storing these contacts in the apertures of the cutters until needed, then aligning them with the ends of the ribbons 18 so that during the next feeding actions of these ribbons the contacts without the aid of tweezers or any other locating means will position the contacts accurately in the pockets formed by the parts 12 and the recesses 32. The locating actions are followed immediately by the welding operations. Movements of the second electrodes 57 into their welding positions close welding circuits to complete the welding operations. The second electrodes are then moved away for the advancement of the ribbon 11 or the set of parts 12 to begin the next operating cycle.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for welding contacts on successively advanced conductive parts which are joined end to end in a generally flat metal strip of indeterminate length, which comprises,
   a first electrode having a recess therein over which the parts are advanced,
   a guide for a conductive ribbon from which the contacts are to be cut,
   a cutter interposed between the guide and the first electrode and having an aperture therein to receive a length of the ribbon,
   means to advance the ribbon longitudinally in the guide transverse to the advance of said metal strip of parts, to feed measured lengths thereof successively into the aperture of the cutter,
   means for moving the cutter relative to the guide to cut contacts of said successively measured lengths therefrom, and for moving said cutter to align the aperture therein with the recess in the first electrode, whereupon said cut contacts are pushed, by the advance of the next successive advanced uncut ribbon, into the recess in said first electrode,
   a second movable electrode,
   means rendered effective upon pushing said contact into said recess for moving said second electrode to press the part into engagement with the contact in the recess to form a pocket therein for the contact,
   means for applying welding energy to said electrodes to weld the contacts successively to the parts, and
   means responsive to the welding of the contacts to the parts for advancing said indeterminate length strip of parts to position each successively advanced part into alignment with said second electrode.

2. An apparatus for welding contacts on conductive parts according to claim 1 in which:
   means is adapted to move the second electrode under predetermined pressure toward the first electrode to cause each part to extend transversely of the recess in the first electrode to form a pocket therein for the contact,
   the cutter being adapted to store a cut contact in its aperture at a position spaced from the contact being welded, and
   means to move the cutter to align the stored contact with the pocket for the next part.

3. An apparatus for welding contacts on conductive parts according to claim 1 in which:
   means is adapted to move the second electrode under predetermined pressure toward the first electrode to cause each part to extend transversely of the recess in the first electrode to form a pocket therein for the contact,
   the cutter being adapted to store a cut contact in is aperture at a position spaced from the contact being welded,
   means to move the cutter to align the stored contact with the pocket for the next part,
   said ribbon advancing means causing the stored contact to be moved from the aperture of the cutter into the pocket of the first electrode, and move a measured length of the ribbon into the aperture of the cutter.

4. An apparatus for welding contacts on conductive parts according to claim 1 in which:
   means is adapted to move the second electrode under predetermined pressure toward the first electrode to cause each part to extend transversely of the recess in the first electrode to form a pocket therein for the contact,
   means to apply a welding pressure through the second electrode, the part and the contact for welding the contact to the part, and
   a tool operated subsequent to the welding of each contact to each part to create like contours in all contacts.

5. An apparatus for welding contacts on successively advanced conductive parts which are joined end to end in a generally flat metal strip of indeterminate length, which comprises,
   first electrodes disposed at fixed positions and having aligned recesses in edges thereof spaced from each other according to the spacing of the conductive parts,
   guides aligned with said recesses for conductive ribbons from which the contacts are to be cut,
   cutters interposed between the guides and the first electrodes and having apertures therein to receive predetermined lengths of said ribbons emanating from said guides,
   means to move the cutters relative to the guides to cut a set of contacts of said predetermined lengths from the ribbons and store them in said apertures,
   means operable to advance the ribbons predetermined distances to force the stored contacts from the apertures of the cutters into the recesses of the first electrodes and locate predetermined lengths of said ribbons in the apertures so that a new set of contacts may be cut and stored in said apertures,
   a second electrode for applying welding energy through said parts, said contacts and said first electrodes to weld the parts onto the contacts, and
   means responsive to the welding of the contacts to the parts for advancing said indeterminate length strip of parts to position each successively advanced part into alignment with said second electrodes.

6. An apparatus for welding contacts on spaced conductive parts according to claim 5 in which:
   means is adapted to guide the parts relative to the first electrodes for successive welding of the sets of contacts thereon, and
   second electrodes adapted to cooperate with the first electrodes to weld the contacts to the parts.

7. An apparatus for welding contacts on spaced conductive parts according to claim 5 in which:
   means is adapted to guide the parts relative to the first electrodes for successive welding of the sets of contacts thereon,
   second electrodes adapted to cooperate with the first electrodes to weld the contacts to the parts, and
   means adapted to cause the second electrodes to position their respective parts with predetermined holding forces across the recesses of their respective first electrodes to form pockets to receive and hold the contacts for welding.

8. An apparatus for welding contacts on spaced conductive parts according to claim 5 in which:
   means is adapted to guide the parts relative to the first electrodes for successive welding of the sets of contacts thereon,
   second electrodes adapted to cooperate with the first electrodes to weld the contacts to the parts,
   means adapted to cause the second electrodes to position their respective parts with predetermined holding forces across the recesses of their respective first electrodes to form pockets to receive and hold the contacts for welding, and
   means operable to apply increased forces to the second electrodes to force the parts against their contacts for welding of the contacts and parts.

9. An apparatus for welding contacts on spaced conductive parts according to claim 5 in which:
   means is adapted to guide the parts relative to the first electrodes for successive welding of the sets of contacts thereon,
   second electrodes adapted to cooperate with the first electrodes to weld the contacts to the parts,
   means adapted to cause the second electrodes to position their respective parts with predetermined holding forces across the recesses of their respective first electrodes to form pockets to receive and hold the contacts for welding,
   means operable to apply increased forces to the second electrodes to force the parts against their contacts for welding of the contacts and parts, and
   means operable to move the second electrodes free of the parts.

10. An apparatus for welding contacts on spaced conductive parts according to claim 5 in which:
    means is adapted to guide the parts relative to the first electrodes for successive welding of the sets of contacts thereon,
    second electrodes adapted to cooperate with the first electrodes to weld the contacts to the parts,
    means adapted to cause the second electrodes to position their respective parts with predetermined holding forces across the recesses of their respective first electrodes to form pockets to receive and hold the contacts for welding,
    means operable to apply increased forces to the second electrodes to force the parts against their contacts for welding of the contacts and parts,
    means operable to move the second electrodes free of the parts, and
    a tool, having a set of forming members, operable to form each set of welded contacts.

References Cited by the Examiner
UNITED STATES PATENTS
2,846,561   8/1958   Pityo _____ 219—79

RICHARD M. WOOD, *Primary Examiner.*

B. STEIN, *Assistant Examiner.*